United States Patent Office 3,206,826
Patented Sept. 21, 1965

3,206,826
CORONA STARTING VOLTAGE OF GAS FILLED CAPACITORS
Robert Andrew Samoden, Wilmington, Del., assignor to E. I. du Pont de Nemours and Company, Wilmington, Del., a corporation of Delaware
No Drawing. Filed Oct. 15, 1962, Ser. No. 230,749
8 Claims. (Cl. 29—25.42)

This invention relates to a process for increasing the corona starting voltage for electrical devices, and more particularly to a process for increasing the corona starting voltage of electronegative gas filled capacitors.

In attempting to operate dielectric film-foil capacitors at very high voltage levels, e.g., 800 volts for a one mil film, the operating voltage of the capacitor is limited by the inherent corona starting voltage level of the capacitor. The corona starting voltage is affected by such factors as geometry, film thickness, gaseous dielectric, and gas pressure. At reasonable gas pressures, e.g., 5 p.s.i.g., the corona levels are borderline for many operating requirements. Higher gas pressures in the capacitor would increase the corona starting level, but pressure vessels would be needed to contain the capacitor, thereby making the unit costly. A similar problem exists in other dielectric film-foil electrical devices such as transformers.

It is, therefore, an object of this invention to provide a process for increasing the corona starting voltage for electrical devices.

A further object of this invention is to provide a process for increasing the corona starting voltage of electronegative gas filled capacitors to make the lighter weight devices operable over a wider range of voltages with a small increase in cost. These and other objects will appear hereinafter.

These and other objects of this invention are accomplished by a process wherein an electrical device such as a capacitor made up of alternate layers of dielectric and conductor is stressed by applying a voltage above the corona starting voltage at least once and preferably in several steps where the voltage is increased with each step. This stressing action makes it possible to increase the corona level of the device to approximately double the initial corona voltage observed. Stressing the capacitor is of a permanent nature since the corona level in the capacitor remains significantly increased even after the electronegative gas is allowed to escape from the unit.

Any electrical device made up of alternating layers of dielectric and conductor can be successfully treated by the process of this invention. Such devices would include transformers, insulated cables, capacitors, etc.

The preferred electrical device comprises a polyethylene terephthalate film metallized on both sides. The metallic coatings are very thin and electrically are 1 ohm/sq. or less and are approximately 1 or 2 millionths of an inch thick. The metallized film is then convolutely wound to form a cylindrical shaped unit filled with an electronegative gas. An alternative arrangement is to intermittently wind a thin metal foil with the metallized film, being careful that the foil does not extend beyond the edges of the metal layers coated on the dielectric film. A still further arrangement is to convolutely wind alternating layers of foil and dielectric film.

The metallized coatings on the dielectric film should be in alignment so as to obtain the highest possible increase in corona starting voltage. The corona starting voltage in a unit with poor metallized coating alignment will have approximately a ⅓ lower corona starting voltage in comparison to a well aligned film.

The preferred material for the dielectric films employed in the electrical devices is polyethylene terephthalate since it has generally superior electrical properties. Films of other polyesters, for example polycarbonates, are also useful; however, other synthetic polymeric films such as the polyolefins, fluorinated polymers and the like, as well as paper, can be employed.

Aluminum is conveniently used for the metal foil and for metallizing the film, but other conductive metals such as copper and zinc are also useful.

The electrical devices used in the present invention are filled with electronegative gases as are known to the art. The preferred electronegative gases used are the perhalohydrocarbons and most preferably the perhalo-lower alkanes either cyclic or straight chained, i.e., octafluorocyclobutane, chloropentafluoroethane, and hexafluoroethane. Sulfur hexafluoride or hexachloride can also be used but the dielectric strengths are not as high as the preferred perhalohydrocarbons. The electrical devices filled with one of the above gases are sealed in gas tight containers under pressure. The type of electronegative gas used is dependent to some extent upon the temperature and pressure ranges in which the electrical device is expected to operate. An important criteria is that the electronegative gas must remain in its gaseous state and therefore the compounds are chosen in relation to operating temperature. The pressure, however, is preferably under 10 p.s.i.g. and most preferably between 3–5 p.s.i.g.

The method of electrically stressing the gas filled electrical device is by applying a voltage higher than the initial corona starting voltage at least once. This stressing can be done in several subsequent steps until the maximum corona voltage or desired corona voltage is reached. A cathode ray oscilloscope is used in the above procedure to detect the corona voltage.

One procedure for stressing the device is to apply a voltage slightly higher, e.g., 100 volts, than the initial corona starting voltage of the device and holding it until the corona disappears. The voltage is again increased and held until the corona again disappears. This procedure is repeated until the maximum or desired corona voltage is reached.

Another procedure is similar to the one above, however, the voltage is decreased to zero before the voltage is increased to a higher level. Finally, one voltage can be applied which is much above the initial corona starting voltage and then held until the corona disappears.

It is preferred to keep the electronegative gas in the electrical device after treatment but it is possible to allow this gas to escape and still retain an increased corona starting voltage level. It has been found that the corona level drops to some degree after the gas has escaped from a capacitor but it is significantly higher than that of a similar capacitor which has not been subjected to the process of the present invention.

The invention can be further understood by referring to the following examples:

EXAMPLE 1

Two convolutely wound capacitors are constructed with each consisting of two strips of 2 inch wide, 2 mil polyethylene terephthalate film coated with aluminum of about 0.001 mil thickness on each side. The metal coatings are 1¾ inches in width on each surface. The two strips of metallized film are interwound with two strips of ¼ mil aluminum foil 1½ inches in width.

The capacitors are placed in separate gas tight enclosures. One is filled with nitrogen at 5 p.s.i.g. and the other with octafluorocyclobutane $(CF_2)_4$ at 5 p.s.i.g. The capacitors are then subjected to the corona starting voltage which is indicated by a cathode ray oscilloscope. The standard sixty cycle current is used in this test. When the corona disappears, which takes place in 15–20 minutes in the fluoro carbon gas filled unit, the voltage is increased until corona again starts. By applying four such electrical stressing actions to this capacitor, it is possible to permanently increase the corona starting voltage from 540 to 780 volts. There is no corona disappearance with the nitrogen filled capacitor and no change in the corona starting voltage is noted. The results are shown in Table I.

*Table I*

| Time (minutes) | Corona Starting Voltage | |
|---|---|---|
| | $(CF_2)_4$ filled capacitor | $N_2$ filled capacitor |
| 0 | 540 | 480 |
| 20 Corona disappeared, voltage elevated to | 600 | 480 |
| 35 Corona disappeared, voltage elevated to | 660 | 480 |
| 50 Corona disappeared, voltage elevated to | 720 | 480 |
| 70 Corona disappeared, voltage elevated to | 780 | 480 |

EXAMPLE 2

A capacitor is constructed of two, 2 inch wide strips of 2 mil polyethylene terephthalate film not metallized and convolutely wound with three one-inch wide aluminum foil strips. The film and foil strips are wound in alternating layers. The capacitor is placed inside a gas tight enclosure and said enclosure evacuated and filled with $C_2F_5Cl$. This unit exhibits a corona starting voltage of 330 volts and is then exposed to applied voltages for given time increments as shown in Table II. The corona starting voltage increases are noted and also shown in Table II.

*Table II*

| Time exposed to voltage, minutes | Applied voltage | Corona starting voltage for $C_2F_5Cl$ filled 2 mil polyethylene terephthalate foil capacitor |
|---|---|---|
| 0 | | 330 |
| 5 | 900 | 390 |
| 10 | 900 | 520 |
| 15 | 1,200 | 690 |
| 20 | 1,200 | 690 |
| 25 | 1,500 | 690 |
| 30 | 1,500 | 720 |
| 40 | 1,500 | 690 |
| 50 | 1,500 | 720 |
| 60 | 1,800 | 720 |
| 70 | 1,800 | 690 |
| 80 | 1,800 | 720 |

EXAMPLE 3

A capacitor as prepared in Example 1 is placed in a gas tight enclosure which is filled with $(CF_2)_4$ under 5 p.s.i.g. pressure. The unit is placed on a corona detector and the initial corona starting voltage is found to be approximately 600 volts. The applied voltage is elevated to 900 volts and kept at this level for 15 minutes. The voltage is then decreased slowly until the corona is no longer visible on the detector. The applied voltage is then raised until corona reignited. Repeated discharge treatments of this type, with successive higher discharge voltages results in an increased corona voltage starting level of 1400 volts. The fluorocarbon gas is then released from the unit. The corona voltage of the unit is checked and found to be 950 volts which is almost twice the level expected of a similar untreated unit in air. This capacitor is then subjected to a life test at 800 volts at 90° C. and operates without corona for 1000 hours.

EXAMPLE 4

This example shows a comparison of the effect of $SF_6$, $(CF_2)_4$, and $C_2F_5Cl$ to nitrogen on the corona starting voltage of capacitors. Six capacitors for each of the above gases are prepared as in Example 1. The units are placed in gas tight enclosures which are evacuated and then filled with the test gases. Six units per gas type are exposed for a total of 120 minutes to applied voltages increased from 0 to 1800 volts. The time the capacitors are exposed to the applied voltage varies from 5 to 10 minutes. At the end of each incremental time period the corona starting voltage is measured and recorded. Table III shows the corona starting voltages for the time increments for the capacitors containing the various gases tested.

*Table III*

| Time exposed to applied voltage, minutes | Corona starting voltages | | | |
|---|---|---|---|---|
| | $N_2$ | $SF_6$ | $(CF_2)_4$ | $C_2F_5Cl$ |
| 0 | 475 | 390 | 400 | 430 |
| 20 | 475 | 625 | 725 | 950 |
| 40 | 475 | 725 | 925 | 1,060 |
| 60 | 475 | 745 | 975 | 1,100 |
| 80 | 475 | 750 | 990 | 1,110 |
| 100 | 475 | 750 | 995 | 1,125 |
| 120 | 475 | 750 | 1,000 | 1,150 |

The process of the present invention increases the corona starting voltage of electrical devices and makes the device operable over a wider range of voltages with a relatively small cost increase compared to methods presently being used.

Techniques which are presently used to suppress corona consist of filling the unit with a liquid dielectric and thereby impregnating the dielectric separator, which in most cases is paper. The time needed for this impregnation operation in many cases takes from 20–60 hours, whereas the present process takes only several minutes to possibly an hour depending on the corona level desired.

The resulting gas filled unit is considerably lighter than conventional units which would be a definite advantage in the airframe and missile industry. Also, the loss of the dielectric gas from this unit will not render it inoperable since an increased corona starting voltage is retained after the gas is allowed to escape.

What is claimed is:

1. A process for increasing the corona starting voltage of an electrical device composed of alternating layers of dielectric and conductor comprising: applying a voltage higher than the initial corona starting voltage at least once while said device is in an atmosphere of an electronegative gas.

2. The process of claim 1 wherein the electronegative gas is a perhalohydrocarbon gas.

3. The process of claim 1 wherein the voltage is applied in successive increasing increments.

4. The process of claim 1 wherein the electrical device is a capacitor.

5. The process comprising: applying to a capacitor composed of alternating layers of polyethylene terephthalate film and a metal conductor a voltage higher than the initial corona starting voltage at least once while said capacitor is in an atmosphere of a perhalohydrocarbon gas so as to increase the corona starting voltage of said capacitor.

6. The process comprising: applying to a capacitor composed of alternating thin layers of polyethylene terephthalate film and aluminum metal a voltage higher than the initial corona starting voltage, while said capacitor is in an atmosphere of a perhalohydrocarbon gas, until the corona disappears; increasing the voltage until corona reappears and holding said increased voltage until the corona again disappears and repeating said voltage increases until a maximum corona voltage is obtained.

7. The process of claim 6 wherein the perhalohydrocarbon gas is octafluorocyclobutane.

8. The process of claim 6 wherein the perhalohydrocarbon gas is chloropentafluoroethane.

References Cited by the Examiner

UNITED STATES PATENTS

| | | | |
|---|---|---|---|
| 2,587,792 | 3/52 | Von Sivers | 219—383 |
| 2,949,424 | 8/60 | Mandelcorn | 174—17.11 |

OTHER REFERENCES

Publication: Electrical Manufacturing, October 1958, pages 86 to 90.

Publication: General Electric Review, September 1937, pages 438–442.

RICHARD H. EANES, JR., *Primary Examiner.*